United States Patent [19]
Hisserich

[11] 3,738,187
[45] June 12, 1973

[54] HUNTING-TOOTH TIMING BOLT

[76] Inventor: Charles A. Hisserich, 447 Cabrillo St., Costa Mesa, Calif. 92627

[22] Filed: Oct. 14, 1971

[21] Appl. No.: 189,189

[52] U.S. Cl. ............................................. 74/231 C
[51] Int. Cl. ............................................. F16g 1/28
[58] Field of Search ................................. 74/231 C

[56] References Cited
UNITED STATES PATENTS
3,603,296   9/1971   Mitchell ........................... 74/231 C OTHER PUBLICATIONS
Merritt, "Gears" –published by Pitman Paragraph Topic–29.2 pp. 440 & 441, Third Ed. 1954.

*Primary Examiner*—Leonard H. Gerin
*Attorney*—Lawrence Fleming

[57] ABSTRACT

A toothed belt or timing belt in a mechanical drive system, which has a number of teeth incommensurable with the numbers of teeth on the pulleys, and preferably a prime number. With this relationship, every tooth on the belt will, during operation, engage every tooth on a pulley in a progressive repeating series, thus equalizing wear and minimizing damage to the belt from repetitive engagement with any deformed or defective pulley tooth, e.g., one having a burr. The invention is useful in drive systems which necessarily have a simple ratio, such as the 2:1 ratio between the crankshaft and camshaft of an internal combustion engine.

5 Claims, 4 Drawing Figures

PATENTED JUN 12 1973

CHARLES A. HISSERICH,
INVENTOR.

BY
Lawrence Fleming
AGENT.

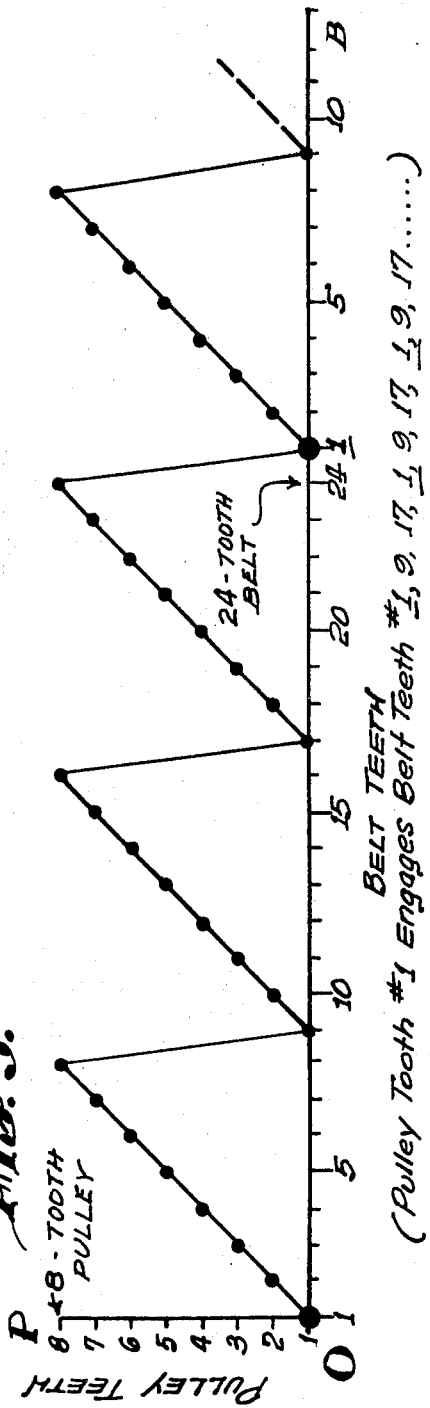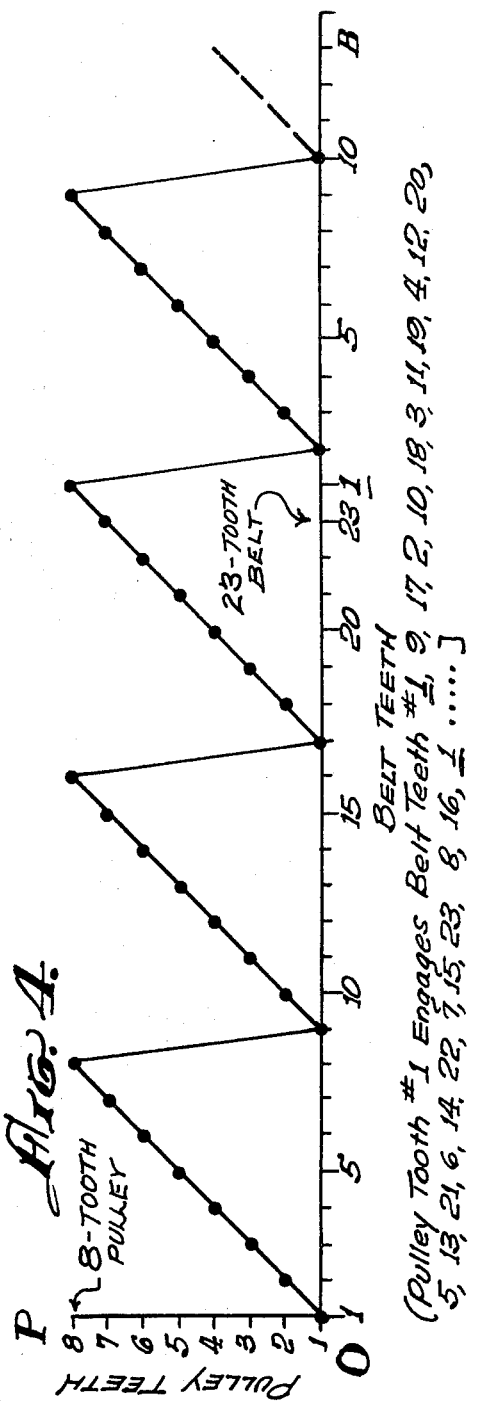

HUNTING-TOOTH TIMING BOLT

BACKGROUND OF THE INVENTION

It is known in the art of gearing that there is an accentuation of wear in systems having a simple ratio such as 1:1 or 2:1. In a 1:1 gear pair, for example, any given tooth on one gear always engages the same corresponding tooth on the other gear. In a 2:1 pair, a given tooth on the smaller gear alternately engages two teeth on the larger gear, and no others. A defect in profile in one tooth may induce a momentary excessive stress in its counterpart, and the repetition of such stress with each revolution may cause excessive local wear or even failure while the remaining teeth stay undamaged. Hence it is known practice to use, where possible, pairs of gears having incommensurable numbers of teeth, such as 20:21. The extra tooth is often called a hunting tooth. With such an arrangement, a given tooth in one gear progressively engages all the different teeth in the other gear, and so the local concentration of wear described above is eliminated; the wear and stress are evenly distributed.

This hunting tooth principle is commonly applied in the design of transmission and differential gearing in automobiles. In drives where the ratio must be exactly some simple value such as 2:1, however, as in timing gears, it is not generally possible to apply the principle except by adding complexity, e.g., using a train of gears.

There is a trend toward the utilization of elastomeric timing belts or toothed belts at higher speeds and loads. While the relatively low elastic modulus of elastomers, such as rubber, tends to reduce the excess local stresses due to profile tolerances in the pulleys, such pulleys are generally manufactured to wider tolerances than are gears, so that with timing belts the wear problem still exists. It is common practice at present to manufacture timing belts with numbers of teeth dictated solely by considerations of layout and convenience.

BRIEF DESCRIPTION OF THE INVENTION

This invention is a toothed belt or timing belt drive system in which the advantage of the hunting tooth principle is gained by novel means. The number of teeth on the belt is chosen to be incommensurable with the numbers of teeth on the pulleys. The invention encompasses a belt having a prime number of teeth (such as 113) which will be incommensurable with the number of teeth on any usable pulley. The pulleys themselves may then have any convenient numbers of teeth and any desired ratio, such as 1:1 or 2:1. By the employment of such a belt, the engagement of each individual belt tooth progresses around each pulley, equalizing the wear and prolonging the life of the belt in the manner described above.

DETAILED DESCRIPTION

In the drawing:

FIG. 3 is a graph illustrating the pattern of successive tooth engagement between a pulley and belt of simple ratio 8:24; and FIG. 4 is a similar graph for the incommensurable ratio 8:23.

Figure 1:
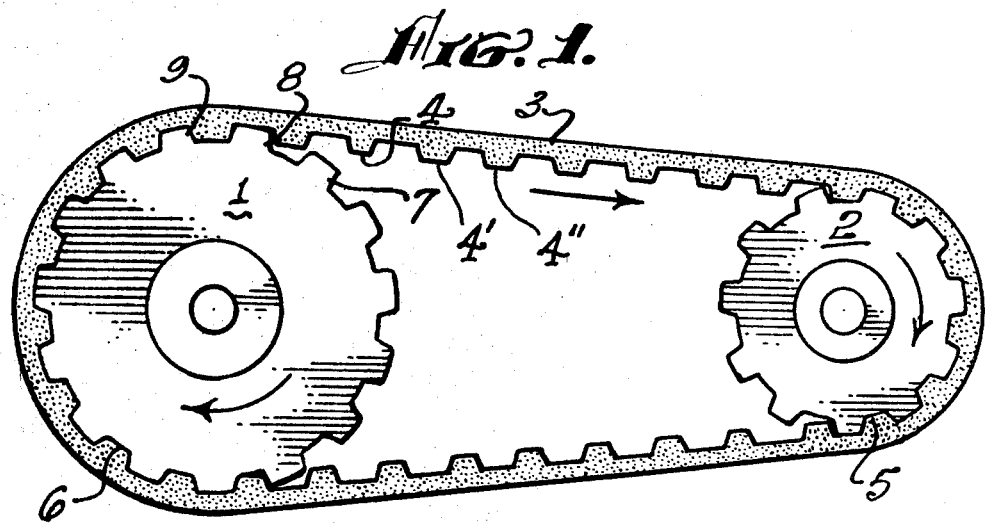
FIG. 1 is a side view of a pair of toothed pulleys connected by a toothed belt to illustrate the principle of the invention.

In FIG. 1, two pulleys 1 and 2 are connected by a toothed belt or timing belt 3. The numbers of teeth shown in the drawings are not necessarily to scale nor typical, but are drawn for clarity of illustration. Assume now, for example, that pulley 1, FIG. 1, has 20 teeth and that belt 3 has 60 teeth. With every revolution of the pulley 1, a given pulley tooth such as 7 will engage one of three belt teeth, spaced 20 teeth apart around the circumference of the belt 3. These may be represented as teeth 4, 5, and 6. Pulley tooth 7 will never engage any teeth of the belt except these three. Assume similarly that pulley 2 has 15 teeth. A given tooth of pulley 2 will successively engage each of 4 teeth of 60-tooth belt 3, spaced 15 teeth apart, and no others. Thus the damaging effect of any burr or error in shape in a pulley tooth would be localized or concentrated among but 3 or 4 of the 60 teeth on the belt.

Assume now that pulley 1 has 20 teeth but the belt 3 has 61 teeth, a number into which 20 will not divide evenly. Assume also that pulley tooth 7 has just left engagement with belt tooth 4. In the next revolution of the belt in the direction indicated by the arrow, pulley tooth 7 will not engage belt tooth 4 again, but the next preceding belt tooth 4'. In the next revolution after that, pulley tooth 7 will engage the next belt tooth 4'', and so on progressively. Any given pulley tooth such as 7 will engage every tooth of the belt progressively in a repeating series. Accordingly, the deleterious effects of a burr or other defect in any tooth of pulley 1 will be distributed evenly among all the teeth of the belt, instead of being concentrated on only a few. Obviously, similar considerations apply to any other pulley such as 2.

If the number of teeth in belt 3 is chosen as a smaller prime number, say 59 instead of 61, the operation is similar except that the progression of belt tooth engagements by a given pulley tooth goes in the opposite direction.

Figure 2:
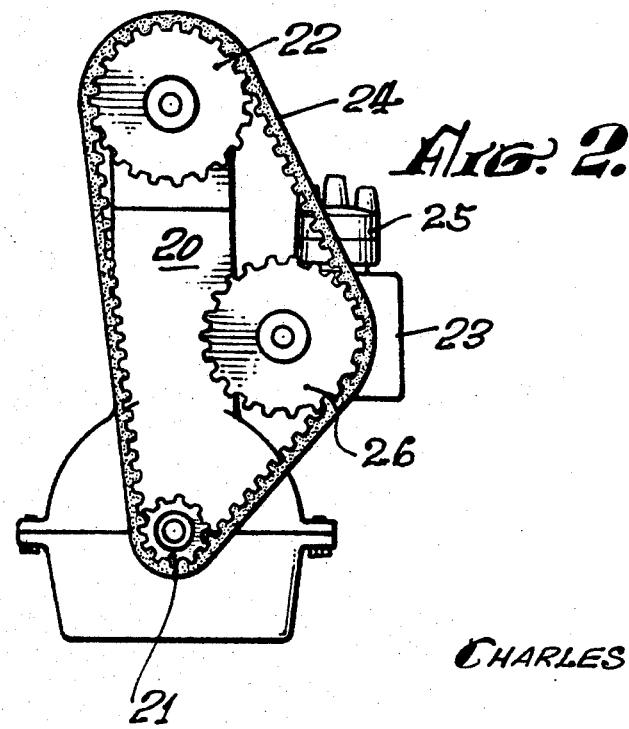
FIG. 2 is a simplified end view of an overhead camshaft engine having a timing belt drive according to the invention.

FIG. 2 illustrates in simplified form an application for a timing belt according to the invention. A front view of an overhead-camshaft internal-combustion engine of ordinary type is indicated at 20, wherein the crankshaft, camshaft, and distributor drive are all connected by a timing belt 24. The crankshaft pulley is shown at 21, the camshaft pulley at 22, and the distributor drive pulley at 26. A pulsating torque of relatively high peak magnitude is required to drive the camshaft, because of the high stiffness of typical valve springs, e.g., 125 lb. of force to open a valve. The load on the belt 24 is therefore considerable, and the demands on the belt the more severe because the load is pulsating. Belt 24 may also drive distributor 25 through any suitable gearing in a housing 23, via tooth pulley 26.

In a typical commercial engine of this type, pulley 21 may have 19 teeth and pulleys 22 and 26 each 38 teeth, the belt 24 having 122 teeth. In such operation, any given tooth on the 19-tooth pulley will engage all the teeth of the belt in a repeating series, since 19 is a prime number. On either of the 38-tooth pulleys 22 and 26, however, a given tooth will engage only half of the teeth on the 122-tooth belt, always missing alternate belt teeth; this happens because 38 and 122 are both divisible by 2. Examples show that if the respective tooth numbers of any pulley and belt are each evenly divisible by a number N, i.e., if their greatest common divisor (G.C.D.) is N, then any given pulley tooth will engage only a set of teeth numbering 1/N of the teeth of the belt, and no others. Examples are given in connection with FIGS. 3 and 4, to be described presently.

According to the invention, a timing belt such as 24, FIG. 2, may have a prime number of teeth. For the engine in the example described above, a suitable number would be 113 or 127. When such a belt has a prime number $N_t$ of teeth, and runs on a pulley having any number of teeth $N_p$, there can be no common divisor of $N_t$ and $N_p$, unless $N_p$ equals either $N_t$ or 1; these cases are obviously mechanically impossible. Accordingly, any given pulley tooth will engage the teeth of such a belt in a progressive series which includes all the belt teeth, this series repeating indefinitely. Thus, wear is evenly distributed.

FIG. 3 is a graphical diagram of the progressive engagements of teeth on a pulley with teeth on a toothed belt. For convenience of illustration, this example assumes an 8-tooth pulley and a 24-tooth belt. The greatest common divisor N of 8 and 24 is 8. It may then be expected that any given pulley tooth will engage only 1/N=⅛ of the 24 belt teeth, or only 3 of them. The example demonstrates this.

In the graph of FIG. 3, pulley tooth numbers are plotted upward along axis OP, and belt teeth horizontally along axis OB. Each dot along the saw-tooth-shaped graph indicates a mutual tooth engagement. It will be seen that at point O, pulley tooth No. 1 is engaging belt tooth No. 1; at the next point, pulley tooth No. 2 with belt tooth No. 2, and so on until the next engagement after belt tooth No. 8: here, pulley tooth No. 1 engages belt tooth No. 9. The next revolution of the pulley, pulley tooth No. 1 engages belt tooth No. 17; then the cycle repeats. The engagement series of pulley tooth No. 1 is, then, to belt teeth No. 1, 9, 17; 1, 9, 17 . . . Accordingly, as expected, any given pulley tooth engages a set numbering only three of all the teeth on the belt, or one-eighth of its 24 teeth, in an infinitely repeating series. The wear and damage imparted to the belt by a burr or other defect on any pulley tooth would, in this instance, be 8 times greater, due to repetitive localization, than if the burred or defective pulley tooth progressively engaged all the teeth of the belt.

FIG. 4 is a graph similar to FIG. 3 except that the belt now has 23 teeth instead of 24. The numbers 8 and 23 are incommensurable; 23 is prime. If now the successive engagements of belt teeth and pulley teeth are plotted graphically as before, it is found that pulley tooth No. 1 (which numbering is arbitrarily selected among the teeth on the pulley) engages successively belt teeth No. 1, 9, 17; 2, 10, 18; 3, 11, 19. . . and so on until all of the teeth on the belt have been engaged, before the starting-point engagement of belt tooth No. 1 with pulley tooth No. 1 is reached again. The complete series is shown on the drawing. Thus, there is even distribution of wear, and of the effects of any burrs or other defects which the pulley may have.

It will be appreciated that, according to the invention, the progression of engagement and resulting equalization of wear and stress around the belt is not a function of the ratios of the numbers of pulley teeth to each other, but solely of the ratios of pulley teeth to belt teeth. Thus, there accrues no operating penalty if the pulleys in a drive system are chosen to have any suitable and convenient numbers of teeth, such as 10 and 20, or 24 and 48, provided only that the toothed belt which connects them has a prime number of teeth. In FIG. 2, for example, considerations of torque or belt bending radius or the like might favor a pulley of 20, 21, or 22 teeth, instead of the prime number 19. Provided that the belt 24 has a prime number of teeth, such pulleys are as permissible as the 19-tooth pulley actually used in commercial practice.

It will also be apparent that the invention offers two advantageous alternatives in its use: with pulleys manufactured to the presently usual standards, the life of the belt is extended; alternatively, cheaper and less-precise pulleys may be used while keeping the life of the belt substantially the same.

I claim:
1. A mechanical drive system comprising a first and a second toothed pulley, each having predetermined numbers of teeth, and
   a flexible elastomeric belt connecting said pulleys and having teeth engaging the teeth on said pulleys,
   said first pulley having an irregularity sufficient to cause substantial local wear in said belt by repetitive engagement with portions of said belt, and
   the number of teeth on said belt being incommensurable with the number of teeth on said first pulley,
   whereby said wear is evenly distributed around said belt.
2. A mechanical drive system according to claim 1, wherein:
   the number of teeth on said belt is a prime number.
3. A mechanical drive system according to claim 1, wherein:
   the torque transmitted by said system is relatively high and relatively intermittent, and
   the ratio between said pulleys is a small discrete number.
4. A mechanical drive system according to claim 3, wherein:
   said ratio is exactly 2.
5. In an internal combustion engine having a timing belt pulley connected directly to its crankshaft and having a predetermined number of teeth, and another timing belt pulley connected directly to its camshaft and having exactly twice said number of teeth,
   said pulleys being subject to manufacturing irregularities adapted to produce localized wear upon portions of a timing belt by selective repetitive engagement therewith,
   a toothed timing belt of flexible elastomeric material connecting said pulleys and having a prime number of teeth,
   whereby said wear is evenly distributed among all the teeth of said belt, whatever the numbers of teeth in said pulleys.

* * * * *

UNITED STATES PATENT OFFICE
CERTIFICATE OF CORRECTION

Patent No. 3,738,187          Dated June 12, 1973

Inventor(s) Charles A. Hisserich

It is certified that error appears in the above-identified patent and that said Letters Patent are hereby corrected as shown below:

The title should read -- HUNTING TOOTH TIMING BELT --.

Signed and Sealed this

Eighth Day of March 1977

[SEAL]

Attest:

RUTH C. MASON  
*Attesting Officer*

C. MARSHALL DANN  
*Commissioner of Patents and Trademarks*